(12) United States Patent
Spitthöver et al.

(10) Patent No.: US 11,510,285 B2
(45) Date of Patent: Nov. 22, 2022

(54) METHOD FOR OPERATING A HEATING ELEMENT

(71) Applicant: Vorwerk & Co. Interholding GmbH, Wuppertal (DE)

(72) Inventors: Christoph Spitthöver, Wuppertal (DE); Torsten Lang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 909 days.

(21) Appl. No.: 16/250,996

(22) Filed: Jan. 17, 2019

(65) Prior Publication Data

US 2019/0223258 A1 Jul. 18, 2019

(30) Foreign Application Priority Data

Jan. 17, 2018 (EP) .................................... 18152116

(51) Int. Cl.
*H05B 3/00* (2006.01)
*H05B 1/02* (2006.01)
*A47J 43/046* (2006.01)
*A47J 27/00* (2006.01)

(52) U.S. Cl.
CPC .......... *H05B 1/0261* (2013.01); *A47J 27/004* (2013.01); *A47J 43/046* (2013.01);
(Continued)

(58) Field of Classification Search
CPC ...... H05B 3/0019; H05B 3/0076; H05B 3/12; H05B 3/26; H05B 3/34; H05B 3/688;
(Continued)

(56) References Cited

U.S. PATENT DOCUMENTS

| 3,789,190 A | 1/1974 | Orosy et al. |
| 2009/0146623 A1* | 6/2009 | de Cremoux ....... H02M 3/1582 323/271 |

(Continued)

FOREIGN PATENT DOCUMENTS

| CN | 102160453 A | 8/2011 |
| CN | 102345495 A | 2/2012 |

(Continued)

OTHER PUBLICATIONS

European Office Action dated Dec. 11, 2019 for corresponding European application No. 18 152 116.2 with English translation, pp. 1-6.

(Continued)

*Primary Examiner* — Hung D Nguyen
(74) *Attorney, Agent, or Firm* — Intellectual Property Law Group LLP

(57) ABSTRACT

The invention relates to a method for operating a heating element (210), in particular in a food processor (1) for the at least partially automatic preparation of foodstuffs, wherein the following steps are performed: a) detecting an electrical resistance of the heating element (210) such that at least one resistance value is determined, b) performing a heating operation on the heating element (210) based on the at least one determined resistance value to perform the heating operation depending on a temperature of the heating element (210).

17 Claims, 5 Drawing Sheets

(52) U.S. Cl.
CPC ......... *H05B 1/0258* (2013.01); *H05B 3/0019* (2013.01); *H05B 3/0076* (2013.01); *H05B 2203/019* (2013.01); *H05B 2203/02* (2013.01)

(58) Field of Classification Search
CPC ........ H05B 3/74; H05B 3/746; H05B 1/0227; H05B 1/0258; H05B 1/0261; H05B 1/0269; H05B 1/0288; H05B 1/0297; H05B 2203/003; H05B 2203/007; H05B 2203/014; H05B 2203/017; H05B 2203/019; H05B 2203/02; H05B 2203/026; A47J 43/046; A47J 27/004; A47J 27/14; A47J 27/21091
USPC ....... 219/429, 430, 436, 438, 441, 442, 485, 219/487, 488, 489, 490, 494, 497, 499, 219/501

See application file for complete search history.

(56) References Cited

U.S. PATENT DOCUMENTS

| | | | |
|---|---|---|---|
| 2010/0018963 A1* | 1/2010 | Rosenbauer | H02H 5/042 219/488 |
| 2017/0367515 A1* | 12/2017 | Cornelissen | A47J 27/004 |
| 2018/0008089 A1* | 1/2018 | Jiang | A47J 36/06 |

FOREIGN PATENT DOCUMENTS

| | | |
|---|---|---|
| CN | 102362791 A | 2/2012 |
| CN | 103828483 A | 5/2014 |
| CN | 107145182 A | 9/2017 |
| DE | 20 2006 020208 U1 | 1/2008 |
| DE | 10 2015 101299 A1 | 8/2016 |
| KR | 100784314 B1 | 12/2001 |
| WO | WO 2008/046852 A1 | 4/2008 |

OTHER PUBLICATIONS

China Office Action dated Dec. 25, 2020 for corresponding China application No. 201910039278.2 with English translation summary, pp. 1-14.

European Office Action dated Oct. 22, 2020 for corresponding European application No. 18 152 116.2 with English translation summary, pp. 1-5.

European Search Report, dated May 7, 2018, for corresponding European Patent No. 18 15 2116.

China Office Action dated Sep. 6, 2021 for corresponding China application No. 201910039278.2 with English translation, pp. 1-15.

* cited by examiner

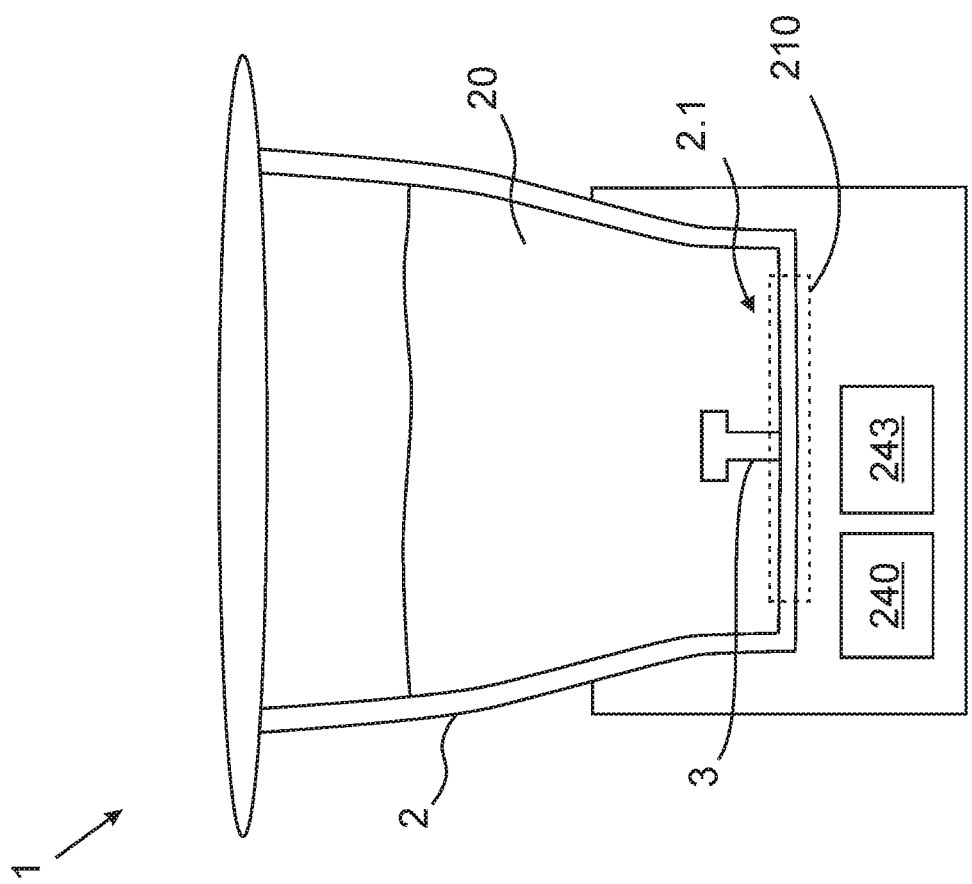

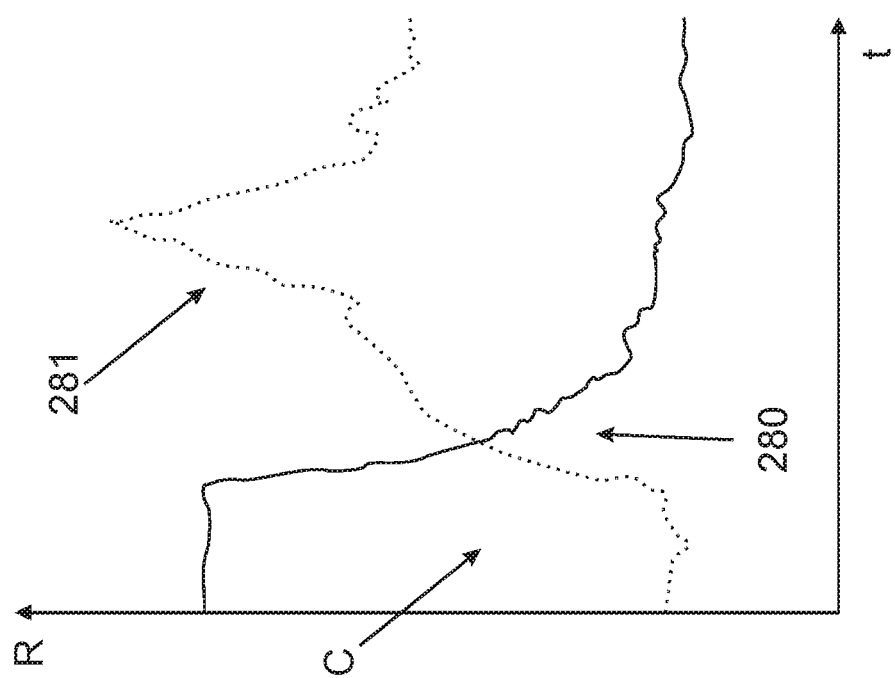

METHOD FOR OPERATING A HEATING ELEMENT

CROSS-REFERENCE TO RELATED APPLICATIONS

This application claims priority to European application no. 18 152 116.2 filed on Jan. 17, 2018, which is hereby incorporated by reference in its entirety.

BACKGROUND OF THE INVENTION

1. Field of the Invention

The present invention relates to a method of operating a heating element, in particular a kitchen appliance. Furthermore, the invention refers to a detection device, a heating system, a food processor with the heating system and a computer program product for operating the heating element.

2. Background

It is known in food processors that heating systems are used to heat a medium. A temperature is often set to which the medium is to be heated, e.g. automated or set by a user of the food processor. In order to now operate a heating element of the heating system in such a way that this temperature is reached and maintained, a heating, and in particular a temperature control can conventionally be carried out, which uses a measurement of a separate temperature sensor, such as an NTC resistor, for the control (as controlled parameter).

A disadvantage of the known solutions for the operation of a heating element, especially for heating control, is that the temperature cannot be reliably maintained. For example, it can happen that an inhomogeneous medium (e.g. different foodstuffs as medium) causes a local temperature change in the heating element. These so-called hotspots on the heating element can cause the medium to burn at these points.

SUMMARY

It is therefore an object of the present invention to at least partially eliminate the disadvantages described above. In particular, it is the object of the present invention to provide an improved heating control without complex measuring sensors or measuring sensor technology.

The preceding object is solved by a method with the features of the independent method claim, by a detection device with the features of the independent device claim, by a heating system with the features of the independent system claim, by a food processor with the features of the further independent device claim, and by a computer program product with the features of the corresponding further independent device claim. Further features and details of the invention result from the respective dependent claims, the description and the drawings. Features and details which are described in connection with the method according to the invention also apply, of course, in connection with the device according to the invention, the heating system according to the invention, the food processor according to the invention as well as the computer program product according to the invention, and vice versa in each case, so that with regard to the disclosure of the individual aspects of the invention mutual reference is or can always be made.

The object is solved in particular by a method for operating a heating element, such as a heater, in particular in a food processor or kitchen appliance (such as a kettle, oven or stove, etc.) for at least partially automatic preparation of foodstuffs.

It is advantageous that at least one of the following steps can be carried out in a method according to the invention, whereby the steps are preferably carried out one after the other or in any order, and if necessary individual steps can also be repeated:

a) Detection of an electrical resistance of the heating element so that at least one resistance value is determined, b) Carrying out a heating operation in the heating element using the at least one determined resistance value, wherein for this purpose the at least one determined resistance value is preferably evaluated by an evaluation device, and in particular a temperature of the heating element is determined using the at least one determined resistance value in order to carry out the heating operation as a function of the temperature.

In other words, the (currently) determined resistance value, which is specific for the electrical resistance of the heating element (called resistance for short), can (preferably directly) serve as a basis for the temperature-dependent heating operation. This heating operation is therefore to be understood in particular as a control (hereinafter also: heating control, temperature control) in which the temperature of the heating element and thus the (currently available) resistance, which is specific to the (respective) temperature, serves as the controlled parameter. For example, the resistance value can be evaluated (and if necessary also processed), preferably compared with a setpoint value for the temperature or the resistance, in order to determine a control difference through the comparison. Thus, an additional temperature sensor can be dispensed with in the method according to the invention. Preferably, an (electronic) controller can be used for control to enable this heating operation. For heating operation, an energy source, such as an AC voltage source, can be used to transfer energy to the heating element to create an electrical current flow through the heating element (to generate heat and heat the medium). For example, the heating operation is clocked and/or according to a switching frequency, with which energy is transferred from the energy source to the heating element. By varying the switching frequency (e.g. by controlling semiconductor switches) the energy transfer and thus the temperature of the heating element can be influenced, and thus also the heating control (or temperature control) can be enabled. Advantageously, a temperature, in particular a medium temperature (of a medium in the area of the heating element, e.g. in the stirring vessel), can thus be determined on the basis of electrical parameters of the heating element, in particular of a thick-film heater.

Preferably, according to step a), the resistance of the heating element is detected as an electrical resistance of an electrical conductor of the heating element through which an electrical current is conducted to generate heat (in particular due to the heating of the conductor). At the same time, by recording the resistance, a resistance value can be determined which indicates the temperature caused by this heat generation. In particular, the heating function is provided by the heating of the conductor.

The advantage of using the resistance value to provide temperature dependency during heating operation is that a particularly reliable and technically simple way of carrying out heating operation is possible, at which the temperature can be set very precisely. Additional sensors for temperature measurement can also be dispensed with in order to further reduce costs and complexity.

Preferably in step b) a temperature value is determined on the basis of at least one determined resistance value, and this temperature value is used as an input value for heating operation, in particular heating control. Alternatively, at least one determined resistance value can be used directly (without conversion) as an input value, e.g. as a controlled parameter. The latter case is also understood as a determination of the temperature (e.g. according to step b)), since this does not necessarily require the conversion into an absolute temperature value. Rather, the determination of the at least one resistance value can already include the determination of the temperature, since the resistance of the heating element is specific to the temperature of the heating element.

In particular, the heating element is part of a heating system, preferably for heating a medium, e.g. in a stirring vessel of a food processor. Surprisingly, it was found that the ohmic resistance of the heating element, especially of a thick-film heater, is proportional to the temperature of the heater. This enables to technically measure the electric current and/or the electric voltage with activated heating and to calculate the resistance. Thus, the electrical (i.e. ohmic) resistance of the heater can serve as the basis for temperature control.

It is advantageous if, depending on at least one resistance value, a medium temperature of a medium in a stirring vessel of the food processor is determined. For example, empirically determined relationships can be used for this purpose, which can preferably be stored electronically in a data base and/or in a data memory by means of a function sequence, in order to be able to calculate or determine the media temperature from at least one resistance value. For example, with the known structure and configuration of the stirring vessel, it is possible that the influence of the heating element on the medium in the stirring vessel can be predetermined. It may be advantageous to provide that the type of medium is also known, e.g. by entering a user at the food processor. It may also be possible for the heating control to be carried out on the basis of the resistance value, in particular for heating at least one foodstuff in a stirring vessel of the food processor, the heating element being fixed to the stirring vessel, in particular being integrated in a base of the stirring vessel.

A further advantage can be achieved by the fact that the detection of the electrical resistance (according to step a)) is understood as a two-dimensional temperature monitoring of the heating element. The heating element preferably has a flat formation and/or extension so that local temperature changes, such as hotspots, may occur in the heating element. Hotspots are local temperature increases, which can locally change the resistance of the heating element. These are caused, for example, by different heat capacities at the heating element, i.e. a medium is only partially in heat exchange with the heating element (e.g. due to an inclination of the stirring vessel or due to an inhomogeneous composition of the medium in the stirring vessel). Based on an evaluation of at least one determined resistance value, a detection of these hotspots can be made possible, i.e. an area-wide monitoring can take place.

It is also conceivable that in step a) a temporal course of resistance values is determined, whereby a local temperature change, in particular hotspots, in the heating element is determined on the basis of an evaluation of the course.

The invention may also provide for the "medium" to refer to the contents of the stirring vessel, i.e. to include different substances and/or foodstuffs.

The use of the electrical resistance of the heating element as the basis for heating operation, in particular temperature control, has the further advantage that the temperature can also be recorded at high switching frequencies of the heating element (e.g. above 2 kHz). Advantageously, the heating element can be operated with a switching frequency in the range from 2 kHz to 40 kHz, preferably 10 kHz to 30 kHz, preferably 20 kHz.

For example, it may be possible that during heating operation the heating element is controlled with a switching frequency that is particularly greater than 1 kHz or greater than 2 kHz. The heating element is preferably configured as a thick-film heater.

It may also be possible that the heating operation is carried out as temperature control of the heating element with the temperature of the heating element as controlled parameter. Thus the temperature control can be carried out efficiently, especially as a heating control for the heating element for heating a medium, and e.g. a burning of the medium can be avoided.

It is also conceivable that during heating operation the temperature for heating operation can only be determined on the basis of the resistance detected or on the basis of at least one resistance value, so that a separate temperature sensor (e.g. NTC sensor, i.e. a heat conductor) can be dispensed with. This has the advantage that costs and installation space are saved and, for example, the number of plug contacts in a stirring vessel can be reduced.

In addition, it may be provided that during the heating operation of the heating element for heating control, the resistance is repeatedly detected in accordance with step a), the resistance value (in accordance with step a)) in each case being determined by comparing at least one measured current value from a current measurement in the heating element and at least one measured voltage value from a voltage measurement in the heating element with one another. This has the advantage that during heating operation, i.e. with active heating, the temperature of the heating can be determined reliably and efficiently. Advantageously, the comparison for determining the resistance value can be made by dividing the measured voltage and current values.

A further advantage within the scope of the invention can be achieved if a local temperature change in the heating element is detected and/or recorded on the basis of the at least one resistance value, wherein preferably in step b) a (temporal) change characteristic of the determined resistance values is evaluated for this purpose, wherein preferably in step a) a temporal characteristic and/or a gradient of the resistance values is determined for this purpose. For example, in step a) several resistance values can be determined for different points in time, e.g. cyclically and/or at regular intervals. The acquisition times (measurement times) at which the resistance values have been determined are also determined and/or temporarily stored in preference. In other words, a resistance gradient can be calculated on the basis of the determined resistance values and the associated measurement times. A strong change of the gradient (e.g. a sudden increase) can indicate a hotspot, which locally changes the resistance of the heating element. Thus, the change characteristic (i.e. a change in the gradient) can indicate a local change in resistance, in particular a hotspot. This can be used, for example, to lower the temperature of the heating and thus avoid burning the medium (e.g. foodstuffs).

It is also advantageous if a resistance gradient is determined by a repeated acquisition of the resistance during heating operation, whereby a time of acquisition is determined for the respective resistance values and, in particular, stored with the respective resistance value. In particular, the acquisition times can be assigned to the corresponding resistance values, e.g. by a table and/or in a database and/or by using an electronic (e.g. digital) pointer which makes the assignment. For example, the stored acquisition times and/or the stored resistance values are read out and processed by an evaluation device in order to calculate a resistance gradient.

Optionally, it may be possible that in step a) the total resistance of the heating element is measured, i.e. the electrical resistance is determined over the entire surface of the heating element. In other words, a resistance value can be determined according to step a), which is specific to the total resistance of the heater. It is advantageous if the heating operation is carried out as temperature control and the temperature of the heating element is determined exclusively on the basis of the resistance measurement (according to step a)) of the heating element, i.e. in particular without using a separate temperature sensor, such as an NTC resistor. In this way, costs and technical expenditure can be significantly reduced if the heating operation is carried out as temperature control with the temperature as the controlled parameter.

Advantageously, it may be provided in the invention that at or after step b) an analysis of the at least one determined resistance value, and in particular further information about the heating element and/or about a medium in a stirring vessel of the food processor, is carried out, wherein at least one of the subsequent analysis results is determined by the analysis:
- at least one information on a local temperature change in the heating element,
- (at least one information about) a temperature of the medium,
- at least one information on at least one heat capacity of the medium,
- at least one information on a composition of the medium, in particular a type and/or an amount of at least one foodstuff in the stirring vessel.

For example, the analysis can be carried out by an evaluation device. For this purpose, the evaluation device may be connected, for example, to an electronic data memory in order to read information from the data memory for analysis. For analysis, a comparison of this information with at least one resistance value can be carried out if necessary. For example, the information is determined empirically and/or statistically. This means that it is used that certain resistance characteristics or resistance gradient characteristics can indicate further information, which may have to be empirically determined beforehand. For example, the analysis of the resistance values can be used to determine if an increase in resistance of 3 ohms in a certain period of time, e.g. within a maximum of 1 s or within a maximum of 2 s or within a maximum of 5 s or within a maximum of 10 s or within a maximum of 20 s, occurs in order to detect a local temperature change, in particular a hotspot. The analysis can also correlate at least one determined resistance value with a medium temperature. The evaluation device is configured e.g. as electronics and/or as microcontroller and/or as processor and/or as at least one integrated circuit.

Another object of the invention is a detection device for operating a heating element, preferably for detecting resistance in the heating element, in particular in a food processor for the at least partially automatic preparation of foodstuffs:
- a voltage measuring device for measuring an electrical voltage at the heating element,
- a current measuring device for measuring an electric current at the heating element,
- an evaluation device for detecting, in particular determining and/or calculating, an electrical resistance in the heating element by evaluating at least one (voltage) detection value of the voltage measuring device and at least one (current) detection value of the current measuring device, so that preferably at least one resistance value can be determined in order to provide the at least one resistance value for a temperature-dependent heating operation, in particular heating control, of the heating element.

Thus, the inventive recording device has the same advantages as have been described in detail with regard to a method according to the invention. In addition, the detection device may be configured to be operated in accordance with a method in accordance with the invention.

In addition, it may be advantageous in the context of the invention that the voltage measuring device comprises an active rectifier, so that a voltage drop in diodes of the voltage measuring device can be at least partially or predominantly compensated. The active rectifier can preferably compensate for the voltage drop across the diodes so that voltages below the blocking voltage of the diodes (e.g. below 0.7 V) can also be rectified and measured. This allows very efficient voltage measurement by the active rectifier.

Another object of the invention is a heating system for operating a heating element, in particular in a food processor for the at least partially automatic preparation of foodstuffs:
- a detection device, preferably a detection device according to the invention, it being advantageous for the detection device to detect an electrical resistance in the heating element,
- a control device, in particular a control device such as a regulator, for controlling, preferably regulating, the operation of the heating element, the control device being electrically connected to the detection device in order to carry out the control on the basis of the detection of the resistance.

Thus, the heating system according to the invention has the same advantages as those described in detail with regard to a method according to the invention and/or a detection device according to the invention. In addition, the heating system may be suitable to be operated according to a method in accordance with the invention.

Also protected is a food processor for at least partially automatic preparation of foodstuffs, comprising:
- a stirring vessel for receiving and preparing the foodstuffs,
- a heating system according to the invention, whereby the heating system is equipped with a heating element which is integrated in the stirring vessel.

As an option, it may be possible for the heating element to be integrated in a stirring vessel of the food processor, so that a temperature which can be determined according to the heating system according to the invention on the basis of the resistance detected is specific for a temperature of a medium in the stirring vessel. For example, the correlation between the temperature of the heating element and the medium can be used to reliably determine the temperature of the medium on the basis of empirical information, which is pre-stored in a data memory, for example.

Optionally, it may be provided that the heating element is integrated into an agitator vessel bottom of an agitator vessel of the food processor and extends therein flatly for heating a medium in the agitator vessel (so that preferably the detected resistance is specific for a temperature of the medium in the agitator vessel). In particular, the heating element may extend over at least 50% or at least 70% or at least 80% or at least 90% of the total area of the bottom of the agitator vessel. This allows the medium in the stirring vessel to be heated reliably. Alternatively or additionally, it is possible that the heating element is configured as a thick-film heater in order to efficiently heat the medium.

In accordance with an advantageous further development of the invention, it can be provided that an electrical current flowing through the heating element is detected in order to detect the resistance, whereby a shunt resistor is preferably connected in series with the heating element in order to detect the electrical current through the heating element. It may also be possible that an electrical voltage across the shunt resistor is measured and/or amplified by an operational amplifier in order to measure the current, and if necessary the operational amplifier is connected with an offset voltage to increase the measurement potential. Thus, the voltage and/or a voltage difference across the shunt can be amplified by the operational amplifier so that, for example, an analog-to-digital converter (ADC) of the evaluation device (e.g. as a microcontroller) can measure it sufficiently accurately. So that no negative voltage values are present at the ADC, the operational amplifier can be connected with the offset voltage in order to increase the measuring potential for current measurement at the heating element accordingly. It is also advantageous if the recording of the current, in particular current measurement, is only carried out when the heating is active.

Another object of the invention is a computer program product for operating a heating element. In accordance with an advantage of the invention, the computer program product is configured to initiate the execution of the following steps when executed by an evaluation device:
a) Detection of an electrical resistance of the heating element so that at least one resistance value is determined,
b) Carrying out a heating operation in the heating element using the at least one determined resistance value, preferably the at least one determined resistance value being evaluated, preferably a temperature of the heating element being determined using the at least one determined resistance value in order to carry out the heating operation as a function of the temperature.

Thus, the computer program product according to the invention has the same advantages as those described in detail with regard to the method according to the invention. In addition, the computer program product can be configured to initiate or map the steps of an inventive method.

BRIEF DESCRIPTION OF THE DRAWINGS

Further advantages, features and details of the invention result from the following description, in which embodiments of the invention are described in detail with reference to the drawings. The features mentioned in the claims and in the description may be essential to the invention either individually or in any combination. It is shown:

In the following figures, the identical reference signs are used for the same technical characteristics, even for different execution examples.

DETAILED DESCRIPTION OF SPECIFIC EMBODIMENTS

Figure 1:
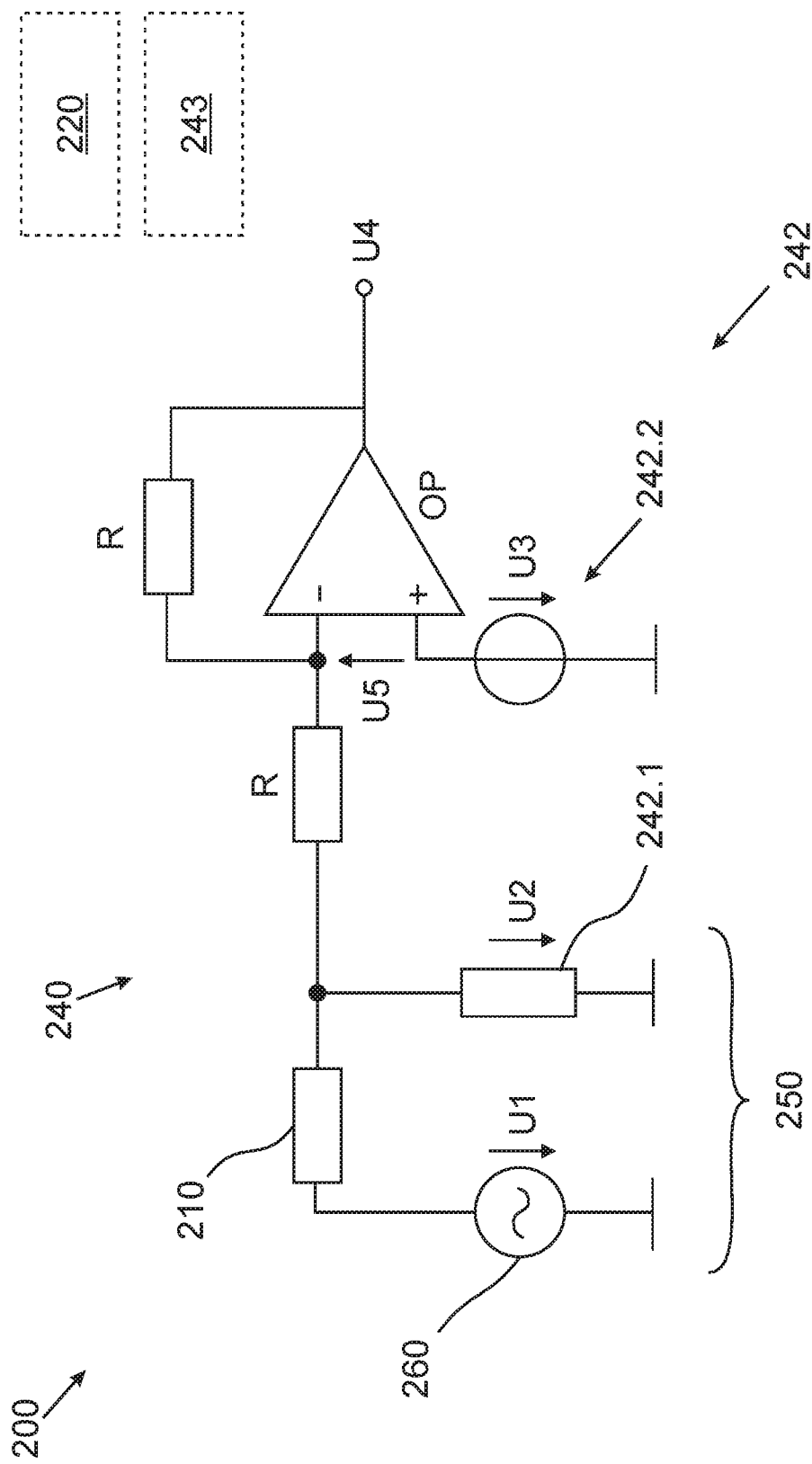
FIG. 1 a schematic representation of a current measuring device.
Figure 2:
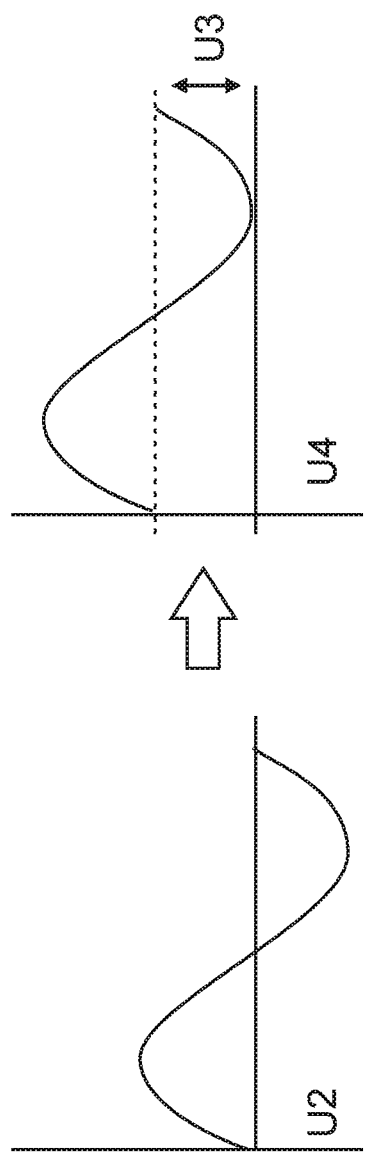
FIG. 2 a schematic representation of the use of an offset voltage for current measurement, FIG. 3 a schematic representation of a voltage measuring device with active rectifier, FIG. 4 a schematic representation of a food processor according to the invention, and FIG. 5 a schematic representation of a change characteristic.
Figure 3:
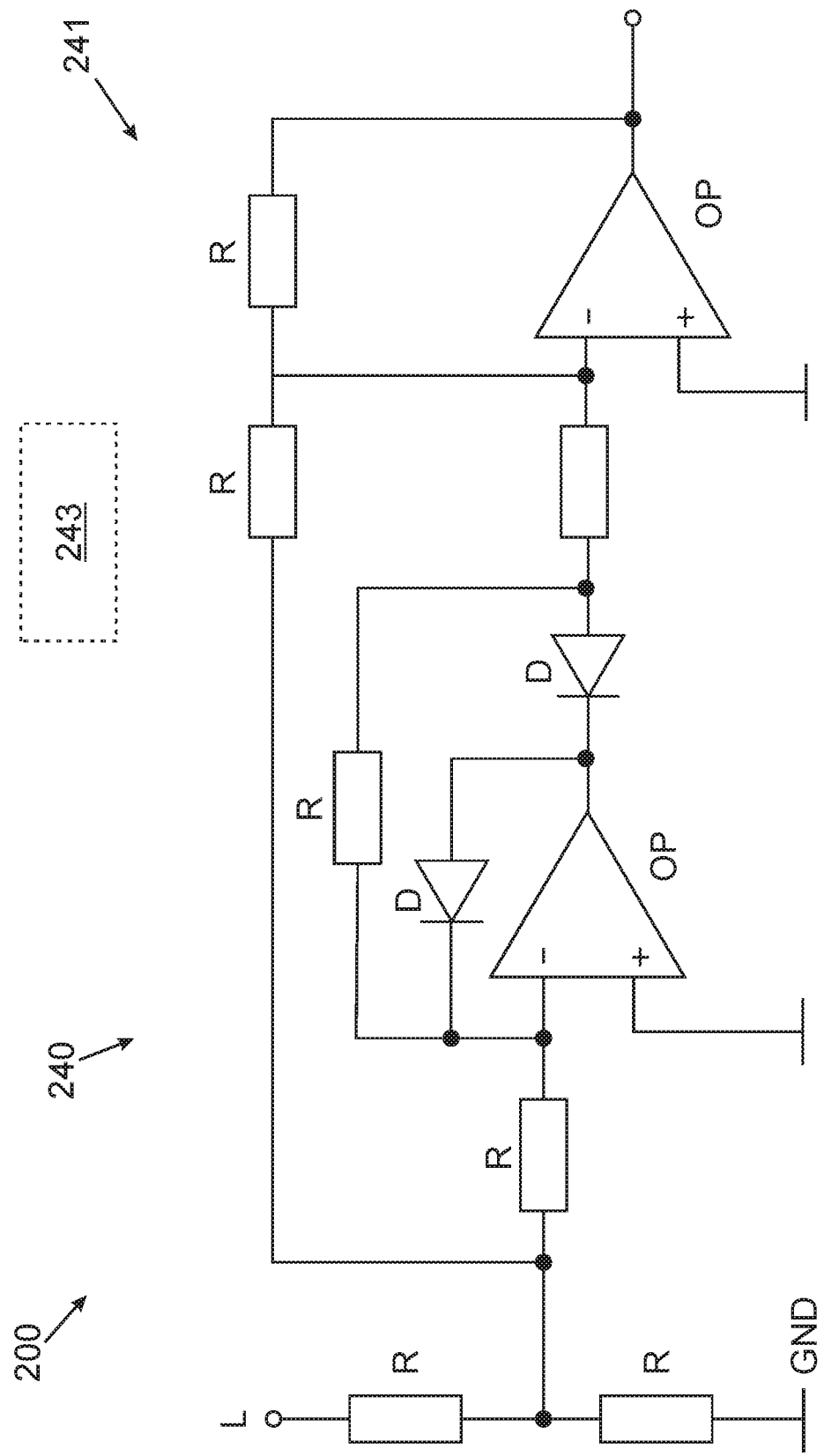

FIGS. 1, 3 and 4 schematically illustrate parts of a heating system 200 for a food processor 1 according to the invention. Furthermore, FIGS. 1 to 5 serve to represent a detection device 240 in accordance with the invention and to visualize a process in accordance with the invention.

FIG. 1 shows that an inventive detection device 240 may have a current measuring device 242. The current measuring device 242 is used to measure an electrical current flowing through a heating element 210, in particular a thick-film heater 210, in a load circuit 250 of a heating system 200. According to ohmic law, this current is linked to an electrical resistance of the heating element 210 and in particular is also dependent on and, if necessary, proportional to a temperature of the heating element 210, at least for a partial temperature range. Thus, the current measurement (if necessary together with a voltage measurement) can be used for heating control, e.g. for the control of a power supply of the heating element 210 by a voltage source 260. Accordingly, a supply voltage marked U1 in FIG. 1 (in particular as an alternating voltage) can be used and/or changed according to the heating regulation by a control device 220 in order to carry out a heating of a medium 20 e.g. in a stirring vessel 2 of a food processor 1. Furthermore, an input voltage U2 via shunt resistor 242.1 is shown, which can be amplified by an operational amplifier OP (with a differential voltage U5). This may still be connected to an offset voltage U3 of a corresponding voltage source 242.2 in order to obtain an output voltage U4. Further resistors R may be provided for the circuit, which may also have different resistance values.

For current measurement the shunt resistor 242.1 is used, which can be integrated serially to the heating element 210 in the load circuit 250. A voltage difference U5, which is dependent on the input voltage U2 over the shunt resistor 242.1, is amplified by means of at least one operational amplifier OP, so that an evaluation device 243, in particular an analog-to-digital converter (ADC) of this evaluation device 243, e.g. of a microprocessor, can measure this sufficiently accurately. So that no negative voltage values are present at the evaluation device 243 or at the ADC, the operational amplifier OP can be connected with the offset voltage U3, which raises the measuring potential. This is also shown in FIG. 2 (the increase is represented by an arrow). In this way, a current value of a current at heating element 210 can be determined very reliably on the basis of the voltage value of the output voltage U4.

FIG. 3 shows that the detection device 240 may also include a voltage measuring device 241 to detect an electrical voltage at the heating element 210. This can include a voltage divider (shown here with an input L, two resistors R and a ground potential GND) to provide an input voltage not explicitly marked as a measurement voltage. The circuit shown in FIG. 3 also includes an active rectifier to compensate for a voltage drop across the diodes D shown in FIG. 3 so that voltages below the reverse voltage of the diodes D (e.g. below 0.7 V) can also be rectified and measured. This enables to provide a very reliable and highly accurate voltage value for controlling the heating element. The voltage value determined by the circuit shown in FIG. 3 can be used together with the current value measured by the current measuring device 242 to determine a resistance value of a resistance of the heating element 219.

FIG. 4 schematically shows a food processor 1 comprising a stirring vessel 2 into which a medium 20 (with at least one foodstuff) can be filled. The stirring vessel 2 can be detachably connected to a holder of the food processor 1 and have a stirrer 3. A heating element 210 of a heating system 200 can also be integrated in a bottom 2.1 stirring vessel to heat the medium 20. An evaluation device 243 and a detection device 240 may also be provided for heating control.

FIG. 5 schematically shows a change characteristic C (with resistance values of a resistance R of the heating element 210 over time t). The dashed line shows the determined resistance values of a detected resistance of the heating element 210, which can be used to determine a temperature of the heating element 210 or the medium 20. This is contrasted with a further curve showing the course of a measured temperature value by a separate sensor. Both curves clearly show a heating-up phase 280, whereas the further course after the heating-up phase 280 differs. Only in the dotted curve (i.e. also according to the temperature determined by the resistance of the heating element 210 according to the invention) is the formation of a so-called hotspots recognizable. In the present case, the stirring vessel 2 was tilted, so that the medium was only partially in heat-transmitted contact with the heating element 210. A similar effect may be caused, for example, by an inhomogeneous medium due to the foodstuffs prepared.

The preceding description of the embodiments describes the present invention exclusively in the context of examples. Of course, individual features of the embodiments can be freely combined with each other, if technically reasonable, without leaving the scope of the present invention.

REFERENCE LIST

1 food processor
2 Stirring vessel
2.1 Stirring vessel bottom
3 Agitator
20 Medium
200 Heating system
210 Heating element, thick-film heating
220 Control device
240 Detection device
241 Voltage measuring device
242 Current measuring device
242.1 Shunt resistance
242.2 Offset voltage
243 Evaluation device
250 Load circuit
260 Voltage source, AC voltage source
280 Heating phase
281 Inclination of the pot, Hot-Spot
t time
C Change characteristics
D Diode
GND Ground potential
OPO operational amplifier
R Resistance
U1 supply voltage
U2 Input voltage
U3 Offset voltage
U4 Output voltage
U5 Differential voltage

What is claimed is:

1. A method for operating a heating element, in particular in a food processor for at least partially automatic preparation of foodstuffs, wherein the following steps are performed:
   a) detecting an electrical resistance of the heating element such that at least one resistance value is determined,
   b) performing a heating operation on the heating element based on the at least one determined resistance value to perform the heating operation depending on a temperature of the heating element,
wherein the heating operation is carried out as temperature control of the heating element with the temperature as a controlled parameter.

2. The method according to claim 1, wherein
   the resistance is repeatedly detected in accordance with step a) during heating operation, the resistance value in each case being determined by comparing at least one measured current value from a current measurement in the heating element and at least one measured voltage value from a voltage measurement in the heating element with one another.

3. The method according to claim 1, wherein
   a local temperature change in the heating element is detected based on the at least one resistance value.

4. The method according to claim 1, wherein
   a resistance gradient is determined by repeated detection of the resistance during the heating operation, a detection time being determined for this purpose for respective resistance values.

5. The method according to claim 4, wherein
   the detection time being stored with the respective resistance value.

6. The method according to claim 1, wherein
   the total resistance of the heating element is detected in step a).

7. The method according to claim 1, wherein
   at or after step b) an analysis of the at least one determined resistance value is carried out, at least one of the subsequent analysis results being determined by the analysis:
      information about a local temperature change in the heating element,
      a temperature of a medium,
      information about at least one heat capacity of the medium,
      information on a composition of the medium.

8. The method according to claim 7, wherein
   analysis results being determined by the analysis of information on a composition of the medium, at least a type or an amount of at least one foodstuff in a stirring vessel.

9. A detection device for operating a heating element, in particular in a food processor for at least partially automatic preparation of foodstuffs, comprising:
   a voltage measuring device for measuring an electric voltage at the heating element,
   a current measuring device for measuring an electric current at the heating element,
   an evaluation device for detecting an electrical resistance in the heating element by evaluating detection values of the voltage measuring device and the current measuring device, such that at least one resistance value can be determined in order to provide the at least one resistance value for a temperature-dependent heating operation of the heating element, wherein the heating operation is carried out as temperature control of the heating element with the temperature as a controlled parameter.

10. The detection device according to claim 9, wherein the voltage measuring device comprises an active rectifier so that a voltage drop in diodes of the voltage measuring device can be compensated at least partially or predominantly.

11. The detection device according to claim 9, wherein the detection device is adapted to perform a method for operating a heating element for the at least partially automatic preparation of foodstuffs, wherein the following steps are performed:
   a) detecting an electrical resistance of the heating element such that at least one resistance value is determined,
   b) performing a heating operation on the heating element based on the at least one determined resistance value to perform the heating operation depending on a temperature of the heating element.

12. A heating system for operating a heating element for at least partially automatic preparation of foodstuffs, comprising:
   a detection device for detecting an electrical resistance in said heating element,
   a control device for controlling the heating element,
the control device being electrically connected to the detection device to perform the control based on the detection of the resistance,
   wherein a heating operation of the heating element is carried out as temperature control of the heating element with the temperature as a controlled parameter.

13. The heating system according to claim 12, wherein the heating system is configured to at least perform a method for operating a heating element for the at least partially automatic preparation of foodstuffs, wherein the following steps are performed:
   a) detecting an electrical resistance of the heating element such that at least one resistance value is determined,
   b) performing a heating operation on the heating element based on the at least one determined resistance value to perform the heating operation depending on a temperature of the heating element,
   or the detection device is configured for operating a heating element for the at least partially automatic preparation of foodstuffs, comprising:
      a voltage measuring device for measuring an electric voltage at the heating element,
      a current measuring device for measuring an electric current at the heating element,
      an evaluation device for detecting an electrical resistance in the heating element by evaluating detection values of the voltage measuring device and the current measuring device, such that at least one resistance value can be determined in order to provide the at least one resistance value for a temperature-dependent heating operation of the heating element.

14. A food processor for at least partially automatic preparation of foodstuffs, with:
   a stirring vessel for receiving and preparing the foodstuffs,
   a heating system for operating a heating element for at least partially automatic preparation of foodstuffs, comprising:
      detection device for detecting an electrical resistance in said heating element,
      a control device for controlling the heating element,
   the control device being electrically connected to the detection device to perform the control based on the detection of the resistance
      in which a heating element is integrated into the stirring vessel,
   wherein a heating operation of the heating element is carried out as temperature control of the heating element with the temperature as a controlled parameter.

15. The food processor according to claim 14, wherein
   at least the heating element is integrated into a base of the stirring vessel of the food processor, and extends flatly therein for heating a medium in the stirring vessel, so that an electrical resistance of the heating element is specific for a temperature of the medium in the stirring vessel,
   or in that the heating element is configured as a thick-film heater.

16. A computer program product for operating a heating element, the computer program product being adapted to initiate execution of the following steps when executed by an electronic evaluation device:
   a) detecting an electrical resistance of the heating element such that at least one resistance value is determined,
   b) carrying out a heating operation on the heating element using the at least one determined resistance value in order to carry out the heating operation as a function of a temperature of the heating element,
   wherein the heating operation is carried out as temperature control of the heating element with the temperature as a controlled parameter.

17. The computer program product according to claim 16, wherein a method for operating a heating element for at least partially automatic preparation of foodstuffs, is carried out by executing the computer program product to perform the following steps:
   a) detecting an electrical resistance of the heating element such that at least one resistance value is determined,
   b) performing a heating operation on the heating element based on the at least one determined resistance value to perform the heating operation depending on a temperature of the heating element.

* * * * *